April 25, 1939.  H. L. RORDEN  2,155,840
ELECTRICAL TRANSFORMER
Filed July 21, 1936
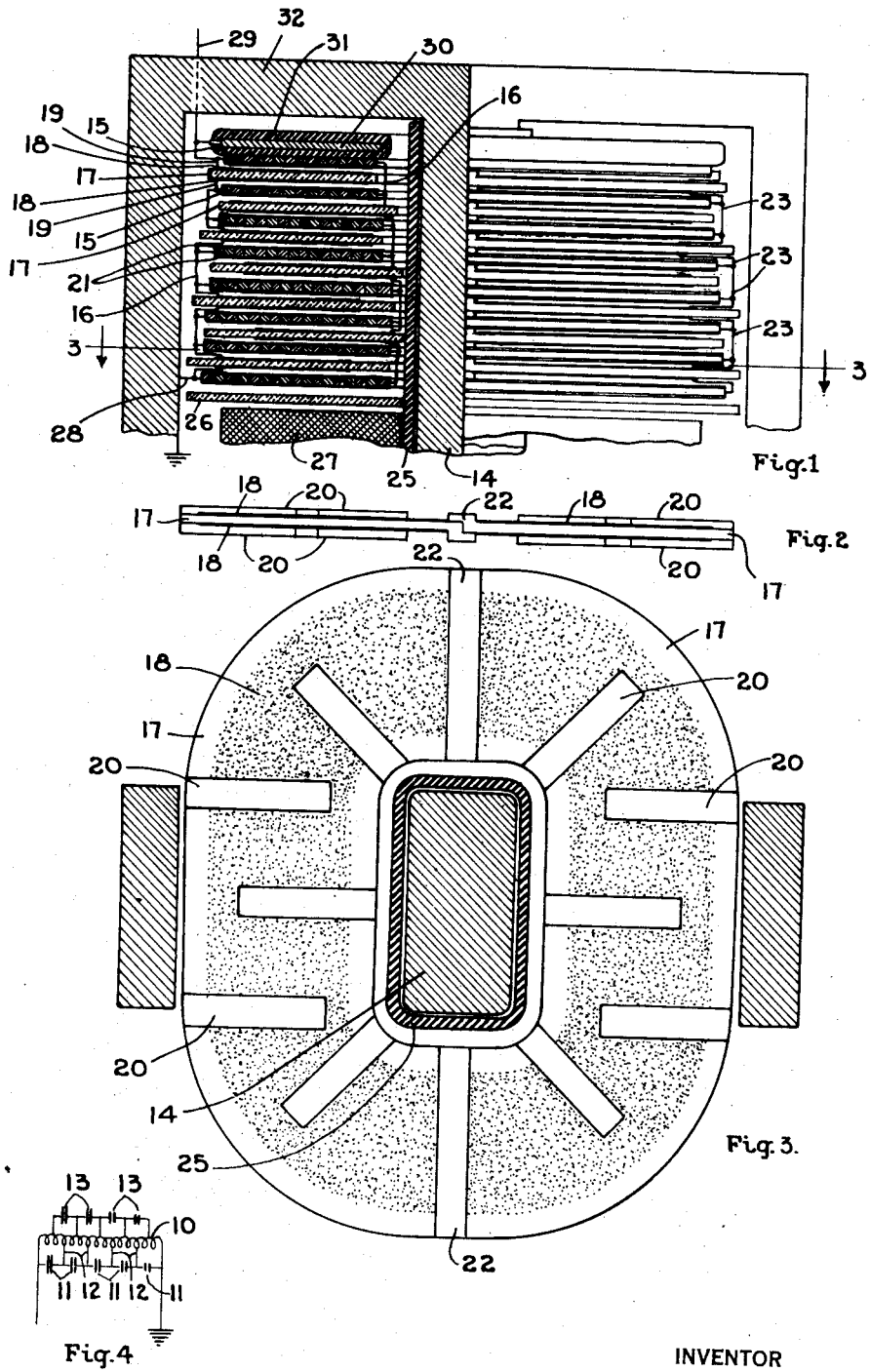
INVENTOR
Harold L. Rorden.
BY *Alpheus J. Crane*
ATTORNEY Patented Apr. 25, 1939

2,155,840

UNITED STATES PATENT OFFICE 2,155,840

ELECTRICAL TRANSFORMER

Harold L. Rorden, Barberton, Ohio, assignor to The Ohio Brass Company, Mansfield, Ohio, a corporation of New Jersey Application July 21, 1936, Serial No. 91,681

5 Claims. (Cl. 175—356)

This invention relates to electric transformers and particularly to transformers for use with high voltage transmission lines, and has for one of its objects the provision of means for preventing damage by transient surges on the line.

More specifically, one object of the invention is to provide means for distributing the voltage gradient produced by a surge in the high potential winding of the transformer and for preventing oscillations from being produced by a transient surge.

A further object of the invention is to provide an effective, economical and convenient arrangement of capacitance members forming a capacitance circuit in parallel with the high potential winding of the transformer and tied into the winding at spaced points thereon to effect a substantially uniform gradient of the voltage impressed upon the winding by a transient surge.

A further object of the invention is to provide a device of the class named which shall be of improved construction and operation.

Other objects and advantages will appear from the following description.

The invention is exemplified by the combination and arrangement of parts shown in the accompanying drawing and described in the following specification, and it is more particularly pointed out in the appended claims.

In the drawing:

Fig. 1 is a somewhat diagrammatic, fragmentary elevation with parts in section of a transformer showing one embodiment of the present invention.

Fig. 2 is an edge elevation of a capacitance element forming a portion of the present invention.

Fig. 3 is a section substantially on line 3—3 of Fig. 1 and showing one of the capacitance elements in plan.

Fig. 4 is a circuit diagram of the high potential winding of the transformer and the capacitance elements connected therewith.

It is a well known fact that transformers connected to transmission lines are subject to steep wave front high voltage surges produced either by lightning or by switching, the voltage of which may be many times that of the normal frequency operating voltage. The effect of transient voltages is apt to be aggravated by oscillations set up in the transformer winding. Voltages may be produced in the transformer winding by such oscillations which are very considerably in excess of the maximum impressed voltage. Since the transformer winding is largely inductive, the transient voltage is not immediately distributed uniformly throughout the length of the winding but may be largely concentrated on a few turns at the line end of the winding. The present invention provides means for effecting immediate distribution of a transient voltage so as to produce a uniform voltage gradient in the transformer winding and also prevent oscillations which would tend to set up voltages in excess of the impressed voltage.

The general plan for effecting these results will be understood from Fig. 4 in which the numeral 10 designates the high potential winding of a transformer. According to the present invention, one or more circuits are provided, consisting of a plurality of capacitors in series, the capacitors forming a shunt path in parallel with the transformer winding and tied into the winding at spaced points therealong to control the voltage gradient in the transformer winding. The numeral 11 designates the capacitors arranged in series and providing a shunt path paralleling the transformer winding 10. The capacitance circuit is connected into the transformer winding at various points 12 distributed along the transformer winding and shunt path. Instead of a single capacitance shunt, a plurality of capacitance shunt paths may be employed if desired. In the embodiment shown in the drawing, a second circuit formed of capacitors 13 is provided, the circuit thus formed being connected into the transformer winding at points alternating between the connections for the circuit formed by the capacitors 11. It will be seen from Fig. 1 that each pair of adjacent winding sections is connected together at one edge and unconnected at the other edge so that when current is flowing these sections will have the same potential at their connected edges but different potentials at their unconnected edges. The interposed capacitor unit has its electrodes connected respectively to the winding at the unconnected edges of the adjacent sections. The capacitor units thus serve as additional insulation between the unconnected edges of the adjacent sections. The arrangement also serves to connect the capacitor units in two separate paths in parallel with the winding with spaced points on each path connected with the winding at the connected edges. Since these connected edges alternate, the arrangement described provides a convenient arrangement for connecting all of the connected winding edges on the inside of the winding with one of the capacitor paths and all those on the outside with the other capacitor path. It will be noted that each capacitor path is substantially free from any series resistance. This is important, for any series resistance introduces a time lag in the capacitor path, due to the time required for the quantity of electricity for charging the capacitors to pass the resistance. Any time lag would defeat the purpose of the capacitance path which is to provide instantaneous voltage distribution along the winding.

The construction and arrangement of the capacitance circuit will be better understood from Figs. 1, 2 and 3 in which the numeral 14 designates the core of a transformer having the high potential winding wound thereabout in a series of layers or "pancakes" 15. The layers are connected in series as indicated by diagrammatical connection lines 16. Alternating with the winding layers 15 are capacitance plates 17. These capacitance plates may be made of any suitable dielectric material but I have found that porcelain is especially suitable for this purpose.

Porcelain has a relatively high specific inductive capacity and insulating value and is unaffected by transformer oil and unchanged by time. It may also be readily coated with metal to provide the conductor elements of the capacitors and may be economically manufactured in shapes suitable for use in the present invention. The opposite faces of each porcelain plate are provided with spacer strips 20, as more clearly shown in Figs. 2 and 3, and the surfaces of these plates between the spacer strips are coated with metallic layers 18 to provide the conductor elements of the capacitor unit. Any suitable method may be used for metallizing the porcelain surfaces, one form of metal coating being described in the patent to Arthur O. Austin, No. 1,536,749, dated May 5, 1925. The opposite metallized surfaces of each capacitance plate 17 are connected to spaced points on the transformer winding by jumpers or other suitable connecting means 19. The capacitor plates are separated from the adjacent layers of transformer windings 15 by these spacers 20, and a sheet of insulating material 21 covers each surface of each layer of transformer windings and engages the spacers 20 on the adjacent capacitor plate. The capacitor plates 17 may be formed in two sections having overlapping edges, shown at 22 in Figs. 2 and 3. The offset portions 22 of the capacitor plates where the sections overlap serve also as spacers for the transformer windings. Where the overlapping edges 22 separate the metallized surface 18 into two sections, the different sections may be separately connected into the transformer winding. This requires a second set of jumpers 23 in addition to the jumpers 19.

The spacers 20 are purposely arranged in staggered relation and divide the metal coatings 18 into sections so as to break up any eddy currents which might otherwise be a source of considerable energy loss. The spacers 20 do not extend entirely across the metallized zone, leaving sufficient connecting strips for electrically connecting the parts of each zone to any one jumper 19 or 23. An insulating sleeve 25 preferably surrounds the core 14 and separates the windings from the core. An insulating plate 26 of porcelain or other suitable material separates the low voltage winding 27 from the high voltage winding. One end of the high voltage winding may be grounded, as indicated at 28, and the other end is connected to the line by a conductor 29. A static plate 30 surrounded by heavy insulation 31 may be electrically connected to the conductor 29 and interposed between the endmost winding layer 15 and the yoke 32. This static plate 30 will prevent concentration of the electrostatic field immediately adjacent the endmost layer 15 of the high voltage winding when the winding is subjected to a surge from the line. In order to give a substantially uniform distribution of the voltage gradient over the high potential winding from its high potential end to the ground end, the capacitance of the various capacitance members 17 is gradually decreased toward the ground end of the winding as indicated diagrammatically by a gradation in the size of the capacitance members in Fig. 4. This may be secured either by grading the thicknesses or the specific inductive capacities of the members 17 or by grading the extent of the coatings on their surfaces. This is necessary because of the tendency of the impedance in the winding itself to concentrate the voltage at the high potential end of the winding. The capacitance of the various capacitance units may be regulated to give substantially uniform voltage distribution over the entire winding.

When adjacent layers of the transformer winding are connected alternately at their inner and outer edges, the alternate capacitor plates will project beyond the windings at their inner and outer edges respectively so as to project beyond the adjacent edges of the windings which are at different potentials.

The transformer shown in the drawing is of the kind having the low voltage winding centrally located on the core and the high voltage winding arranged in two sections, one at each side of the low voltage winding. Only one section of the high voltage winding is shown in the drawing but it will be understood that the other section will be equipped in a manner similar to the one shown. It will also be understood that the invention is applicable to other forms of transformers as well as to the form shown.

I claim:

1. Means for controlling the surge voltage distribution of the high potential winding of a transformer, said means comprising dielectric plates adapted to be interposed between sections of said winding, said plates being formed in separate portions to facilitate manufacture and assembly, the opposite faces of said plates being metallized, and unmetallized projections on said faces for spacing said windings from one another and for breaking up the conductor covering on the faces of said plates to intercept eddy currents.

2. Means for controlling the surge voltage distribution of the high potential winding of a transformer, said means comprising porcelain plates adapted to be interposed between sections of said winding, said plates being divided to facilitate manufacture and assembly and having overlapping portions along the dividing line thereof.

3. Means for controlling the surge voltage distribution of the high potential winding of a transformer, said means comprising porcelain plates adapted to be interposed between sections of said winding, said plates being divided and having overlapping edges, the opposite faces of said plates being metallized and having unmetallized spacer projections thereon, the opposite metallized surfaces of each plate being adapted to be connected respectively with spaced points along said conductor winding to control the voltage gradient of transient voltages impressed on said winding.

4. A transformer having a high potential winding arranged in sections, the conductor of each section being connected at one edge of the section to the conductor of the next adjacent section on one side and, at the other edge, to the conductor of the next adjacent section on the other side so that the conductors of all the sections are continuously connected in series and, when current is flowing in said winding, any two adjacent sections will have the same potential at the connected edges thereof but different potentials at the opposite or unconnected edges thereof, capacitor units interposed between said sections and alternating therewith, each capacitor unit comprising a pair of conductor elements and a dielectric member separating said conductor elements, the conductor elements of each capacitor unit being connected respectively to the conductors of the adjacent winding sections at the unconnected edges of said sections, the capacitor units being thus connected in two capacitance paths, each path having spaced points therein connected respectively to spaced points in said winding, the points in said winding connected with one path being spaced from the points connected with the other path and alternating therewith.

5. A transformer having its high potential winding arranged in thin, flat sections of much greater extent radially of said winding than longitudinally of the axis thereof, the conductor of each section being connected at one edge of the section to the conductor of the next adjacent section on one side and, at the other edge, to the conductor of the next adjacent section on the other side so that the conductors of all the sections are continuously connected in series and, when current is flowing in said winding, any two adjacent sections will have the same potential at the connected edges thereof but different potentials at the opposite or unconnected edges thereof, thin, flat porcelain plates interposed between said sections, the opposite faces of said plates being provided with conductor coverings forming capacitor units with said plates, each of said conductor coverings lying substantially in a single plane, the conductor coverings of each porcelain plate being connected respectively to the conductors of the adjacent winding sections at the unconnected edges of said sections, the capacitor units being thus connected in two capacitor paths, each path having spaced points therein connected respectively to spaced points in said winding.

HAROLD L. RORDEN.